United States Patent Office 2,802,772
Patented Aug. 13, 1957

2,802,772

AEROSOLS COMPOSITIONS; BOMB, AND PROCESS FOR TREATING FLOCKS OF CHICKENS

John A. Elder, Jr., Plainfield, N. J., assignor to Merck & Co., Inc., Rahway, N. J., a corporation of New Jersey No Drawing. Application September 9, 1954, Serial No. 454,849

8 Claims. (Cl. 167—53.1)

This invention relates to aerosol compositions and in particular to aerosol compositions containing solid particles of antibiotics.

Respiratory diseases in farm animals are particularly difficult to treat due to the complex nature of such infections and the large number of animals which require treatment. In relatively recent years, chronic respiratory disease (CRD) has become a serious infectious disease of poultry, particularly broiler chickens. The term CRD as commonly used embraces the extremely serious poultry disease termed "air-sac infection" and "air-sac cold." The disease is evidenced by a persistent, rasping cough and invariably affects the feed consumption of the chicken and results in poor feathering, slower growth and a decrease in laying flocks of 20 to 40 percent in egg production as well as death. Heavy economic losses are attributed to this disease, particularly in the broiler raising areas, as for example in the Delmarva (Delaware-Maryland-Virginia) area alone it has been estimated to have caused a twenty million dollar loss in a few months.

Several experimentally produced respiratory diseases in animals, including air-sac infection in chickens, have been reported to respond satisfactorily to relatively high blood levels of antibiotics such as streptomycin. It has been necessary, to obtain such high blood levels, to administer the streptomycin parenterally. Such individual treatment may be considered practical for the large animals such as horses, cows and pigs, but it is most unsatisfactory for the treatment of smaller animals such as chickens, turkeys, pigeons and the like. The oral ingestion of streptomycin by way of the drinking water of the animals has proven unsatisfactory for treatment of diseases other than those associated with the intestinal tract.

It has been suggested to use aerosols of solutions of streptomycin for treating respiratory diseases in animals. This method while being very desirable as a simple means of administration fails to effectively combat such diseases in the animals treated. This failure is apparently due to the fact that the droplets obtained when an aqueous solution of streptomycin is nebulized are too heavy and do not remain suspended in the atmosphere. This characteristic required the use of aerosol with extremely high concentrations of antibiotics to obtain only a minimum blood level of antibiotics. The conventional aerosols have the disadvantage that the aqueous solutions are corrosive in the presence of the propellant and that they dissolve only relatively small amounts of the propellant such as the Freons or nitrous oxide. A fourth disadvantage of such aerosols is that they require the addition of other agents to make them operable such as stabilizers and emulsifying agents.

An object of the invention is to provide an aerosol which is effective in alleviating respiratory diseases in animals. Another object is to provide an aerosol which overcomes the disadvantage of the heretofore available aerosols. A further object is to provide a simple and economical composition for use as an aerosol. Other objects and the advantages of the invention will appear hereinafter.

In accordance with the invention it has now been found that antibiotics such as streptomycin, dihydrostreptomycin and combinations thereof are rapidly absorbed into the blood stream of animals by way of the respiratory tract when the animals are exposed to a spray of fine solid particles of the antibiotic. In addition to being absorbed into the blood stream, the antibiotic in solid form is present per se in the lungs and air-sacs of the animal and is thus available to attack the respiratory infecting organisms in the manner of a tropical application. The reasons for the superiority of the solid particles over liquid particles is not fully understood. It appears that quite possibly the solid particles more readily cling to the respiratory tract making them more readily available in higher concentration for combatting the infection. It has been found that by using solid particles of the antibiotics it is not necessary to maintain as high a blood level of antibiotic as was heretofore considered necessary to combat the diseases. This treatment can be carried out by placing the animals in a suitable shelter and releasing the antibiotic in nebulized or aerosol form. This method permits medication of larger numbers of animals at one time, thereby eliminating the time consuming and costly task of individual treatment. This surprising development provides an effective, practical and economical method for treating respiratory diseases in animals.

Streptomycin and dihydrostreptomycin and salts thereof are the preferred antibiotics for treating respiratory diseases. The method of the invention is however effective with other antibiotics such as pencillin, aureomycin, terramycin and chloromycetin particularly when a high concentration of antibiotic is required. Also various combinations of antibiotics are within the scope of the invention as for example a combination of one half streptomycin and one half dihydrostreptomycin. The antibiotics may be used in the form of a non-toxic active salt as well as their free base, as for example, the salts of streptomycin and dihydrostreptomycin such as the hydrochloride, sulfate and calcium chloride complex salts. The antibiotics may be used in relatively crude form thereby having an additional advantage in that the expensive final purification measures used in parenteral antibiotic preparations are not necessary.

It is essential to the invention that the antibiotic is present in an extremely fine order of subdivision. The antibiotic is preferably micronized or microatomized which leads to particles substantially all of which are below 50 microns and more desirably 20 microns when the bulk of the material is below 10 microns. Any of the conventional propellants may be used such as the Freons (dichlorodifluoromethane, trichlorofluoroethane, and trichlorofluoromethane) nitrous oxide, carbon dioxide or the like. A mixture of equal parts of dichlorodifluoromethane and trichlorofluoromethane is a particularly effective propellant.

The blood levels of streptomycin required for effective treatment of respiratory diseases appear to be more than 48 gammas per milliliter. The blood level, however, does not take into account the beneficial topical effect gained by administering the antibiotic as an aerosol directly into the lungs and air-sac of the animals which effect is believed to be responsible for the high order of effectiveness of the compositions of the invention. Satisfactory results have been obtained by treating animals with an aerosol containing as little as 4 milligrams of streptomycin per thousand cubic centimeters of air. A range of from about 20 to about 75 milligrams of the antibiotic per thousand cubic centimeters of air is more desirable with a range of 40 to 50 milligrams being the most desirable for the average treatment. Under such conditions the animals may be exposed for varying periods of time depending primarily upon the average antibiotics concentration in the air. At the preferred levels of 40 to 50 milligrams per liter of air an exposure time of from about one half to six hours is sufficient for a broad range of degrees of infection with a period of 2 to 3 hours being more of an average length of time for treating.

The method of producing the aerosol is not critical since any of the conventional methods for producing aerosols can be used with the exception of those methods requiring heat since antibiotics tend to deteriorate upon application of heat. The most desirable methods are the "bomb" type pressurized container and the spray type nebulizer. The former method is especially adapted for the treatment of relatively small numbers of animals whereas the latter method is commonly used in larger operations.

Other therapeutically active ingredients can also be incorporated in the aerosols of the invention. As an example a non-toxic wetting agent or certain proteolytic enzymes such as streptodornase, pancreatic dornase and trypsin may be added in amounts ranging from about 0.01 to 1.0 percent of the composition to dissolve or cut the excessive, thickened mucus found in the respiratory tract of animals infected with respiratory diseases.

The ratio of antibiotics to propellant may vary over a large range depending largely upon the desired discharge rate. It is preferred, however, to use approximately 1 to 10 parts by weight of antibiotic for each 100 parts of propellant.

The following examples are given for purpose of illustration.

Example 1

Crystalline dihydrostreptomycin sulfate micro-atomized to a particle size wherein substantially all the particles are under 10 microns and none over 20 microns is subdivided volumetrically using a powder filler into six gram portions. Pressurized metal containers (12 ounce capacity) are placed on their side and a six gram portion is added to each can. The valve and standpipe assembly is placed in position on each can and crimped into place. The can is kept on its side and the air is evacuated from the container under 30 inches of mercury vacuum. The can is placed upright under a pressure filling apparatus and 300 grams of a mixture of equal portions of dichlorodifluoromethane and trichlorofluoromethane is introduced into the can through the valve. The filled container can be stored below 102° F. Each 12 ounce container contains the equivalency of 4.7 grams of dihydrostreptomycin.

Example 2

A box having a volume of 4500 cubic inches was equipped with a nebulizer connected to an air-compressor which would attain about 10 lbs. pressure and provide a flow rate of about 4 liters of air per minute through the chamber. Five healthy chicks (3 weeks of age, weighing 250–300 gms. each) were placed in the box. Particles of crude streptomycin sulfate wherein substantially all of the particles were less than 10 microns in size were nebulized at the rate of 1000 milligrams per hour. The chicks were exposed to this aerosol (which contained about 0.04 mg. streptomycin sulfate per thousand milligrams of crude material) for one-half hour. Blood samples were taken ½ and 2 hours after the chicks had been exposed and assayed for streptomycin content by the procedure of Stebbins and Robinson, Proc. Soc. Exp. Biol. and Med., 59, 255 (1945). The blood levels attained under these conditions were 1 to 2γ/cc. ½ to 2 hours after exposure.

Any departure from the above description which conforms to the present invention is intended to be included within the scope of the claims.

What is claimed is:

1. An aerosol-producing composition for combatting respiratory diseases comprising solid particles of an antibiotic selected from the group consisting of streptomycin, dihydrostreptomycin, and salts thereof, substantially all of which have a particle size of less than 10 microns and a non-toxic pressure-generating propellant.

2. The composition of claim 1 wherein the pressure generating substance is a mixture of trichlorofluoromethane and dichlorodifluoromethane.

3. The composition of claim 1 wherein the antibiotic is dihydrostreptomycin sulfate.

4. The composition of claim 1 wherein the antibiotic is streptomycin sulfate.

5. An aerosol-producing composition for combatting respiratory diseases comprising a mixture of finely divided particles of streptomycin and dihydrostreptomycin whereine said particles have a size of less than ten microns, and a non-toxic pressure-generating substance propellant.

6. An aerosol-producing composition for combatting respiratory diseases comprising finely divided particles of dihydrostreptomycin sulfate when substantially all of the particles are less than 10 microns and a mixture of dichlorodifluoromethane and trichlorofluoromethane as a propellant.

7. As an article of manufacture an aerosol bomb equipped with a valve for releasing its contents to the atmosphere, containing approximately six grams of dihydrostreptomycin sulfate wherein substantially all of the particles of streptomycin are less than ten microns, approximately 150 grams of dichlorodifluoromethane, and approximately 150 grams of trichlorofluoromethane.

8. A process for treating flocks of chickens having respiratory infections which comprises releasing to the atmosphere surrounding the chickens a composition under pressure greater than atmospheric comprising finely divided particles of an antibiotic selected from the group consisting of streptomycin, dihydrostreptomycin and salts thereof wherein all of the particles are substantially below ten microns in size and a non-toxic pressure generating propellant thereby widely dispersing the finely divided particles of antibiotic in the atmosphere.

References Cited in the file of this patent

UNITED STATES PATENTS

| | | |
|---|---|---|
| 2,533,065 | Taplin | Dec. 5, 1950 |
| 2,533,066 | Taplin | Dec. 5, 1950 |
| 2,621,014 | Efford | Dec. 9, 1952 |

OTHER REFERENCES

Holland: "Microbiotics," Am. J. Pharm., May 1945, pp. 158–174, esp. at pp. 168, 171, and 172.

Drug and Cosmetic Industry, "Inhalation Therapy," February 1949, pp. 167, 168, and 248–252.